(12) United States Patent
Roche et al.

(10) Patent No.: US 7,120,760 B2
(45) Date of Patent: Oct. 10, 2006

(54) HARVARD ARCHITECTURE MICROPROCESSOR HAVING A LINEAR ADDRESSABLE SPACE

(75) Inventors: Franck Roche, Trets (FR); Didier Cavalli, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 509 days.

(21) Appl. No.: 10/645,321

(22) Filed: Aug. 21, 2003

(65) Prior Publication Data

US 2004/0073762 A1    Apr. 15, 2004

Related U.S. Application Data

(63) Continuation of application No. PCT/FR02/00556, filed on Feb. 14, 2002.

(30) Foreign Application Priority Data

Feb. 28, 2001    (FR)    ................... 01 02701

(51) Int. Cl.
*G06F 12/00* (2006.01)
(52) U.S. Cl. .................................... 711/148
(58) Field of Classification Search ................ 711/104, 711/105, 148; 710/305
See application file for complete search history.

(56) References Cited

U.S. PATENT DOCUMENTS

| | | | |
|---|---|---|---|
| 4,592,010 A | 5/1986 | Wollscheid | ................. 364/900 |
| 5,974,528 A | 10/1999 | Tsai et al. | ..................... 712/37 |
| 6,799,157 B1* | 9/2004 | Kudo et al. | ................... 703/28 |

OTHER PUBLICATIONS

Papamichalis et al., The TMS320C30 Floating-Point Digital Signal Processor, IEEE Micro, IEEE Inc. New York, US, vol. 8, No. 6 INDEX, Dec. 1, 1988, pp. 13-29, XP000118458.

* cited by examiner

*Primary Examiner*—Kevin L. Ellis
(74) *Attorney, Agent, or Firm*—Lisa K. Jorgenson; Allen, Dyer, Doppelt, Milbrath & gilchrist, P.A.

(57) ABSTRACT

A microprocessor is connected to a first memory space through a first bus and to a second memory space through a second bus. The microprocessor includes a processing unit that includes a program bus and a data bus, and an interface unit connected, on one side, to the program bus and to the data bus and, on the other side, to the first and second buses. The interface includes a switching circuit for connecting the program bus and the data bus, respectively, to either the first bus or the second bus, in accordance with respective requests for accessing the program and data sent by the processing unit.

23 Claims, 3 Drawing Sheets

HARVARD ARCHITECTURE MICROPROCESSOR HAVING A LINEAR ADDRESSABLE SPACE

RELATED APPLICATION

The present application is a continuation of International Application No. PCT/FR02/00556 filed on Feb. 14, 2002, the entire disclosure of which is incorporated herein by reference.

FIELD OF THE INVENTION

The present invention relates generally to microprocessors, and, more specifically, to a microprocessor using a non-volatile memory including executable instructions of a program and a volatile memory for storing data used by the program.

BACKGROUND OF THE INVENTION

At present, microprocessors can have one of two memory connection architectures. In the first architecture, known as the Von Neumann architecture, the microprocessor is connected to the memories as a whole through a single address and data bus. As a consequence, the microprocessor can only access, at a given time, one data element or one instruction code.

To speed up program execution, a second so-called Harvard architecture was developed, in which the microprocessor could simultaneously access an instruction code and a data element, which are accordingly stored within different memories. The Harvard architecture requires the provision of a microprocessor having two different buses, one of which is dedicated to program access and is connected to the memory including the program, and the other is dedicated to data access and is connected to the data memory.

In this manner, the microprocessor may read an instruction from the program memory and perform a read or write operation from/to the data memory during the same clock cycle. As the result, a Harvard architecture microprocessor needs fewer clock cycles for executing a program than a Von Neumann architecture microprocessor. However, the Harvard architecture has some drawbacks, in particular, in terms of the flexibility of using memories connected to the microprocessor.

Specifically, this architecture requires storing, within predefined and separate respective memory areas, program instructions and non-modifiable data, including operational parameters or parameters that have to be stored in a non-volatile manner. The Harvard architecture cannot be used in a microprocessor connected to only one non-volatile memory and one volatile memory. Moreover, the Harvard architecture does not allow program instructions to be stored within the volatile memory, for example, for test purposes. Also, the Harvard architecture does not allow a program to modify itself by writing executable instruction codes as data into a memory.

SUMMARY OF THE INVENTION

In view of the foregoing background, an object of the present invention is to eliminate the above-mentioned drawbacks by providing a dual-bus architecture while not affecting the linearity of the space addressable by the microprocessor, which is obtained by the Von Neumann architecture.

This and other objects, advantages and features according to the present invention are provided by a microprocessor coupled to a first memory space through a first bus, and to a second memory space through a second bus, and comprising a processor unit provided with an executable program instruction access bus and a data access bus. The microprocessor may comprise a bus interface unit connected, on one side, to the program instruction access bus and to the data access bus, and on the other side, to the first and second buses. The interface may comprise first switching means for coupling the program access bus either to the first bus or to the second bus in accordance with a program access request sent by the processing unit, and second switching means for coupling the data access bus either to the first bus or to the second bus in accordance with a data access request sent by the processing unit.

Advantageously, the first switching means are independent of the second switching means, and the interface unit may further comprise access control means to manage access contention that may occur when the processing unit simultaneously generates a data access request and a program instruction access request, which relate to the same memory space. According to a feature of the present invention, the access control means are designed for granting priority to a data access request when memory space access contention occurs.

Preferably, the access control means are designed for granting simultaneous access to a program instruction within one of both memory spaces and a data element within the other of both memory spaces. Also, the control access means may deny the processing unit access to a program instruction after the processing unit has generated simultaneous instruction and data access requests within the same memory space. Advantageously, the control access means may grant the processing unit access to memory space only during the time period in which the memory space grants access thereto.

According to another feature of the present invention, the microprocessor is connected to a program instruction address decoder and a data address decoder, which are designed to generate selection signals in accordance with addresses present on the program and data access buses, and in accordance with access requests sent by the processing unit in which selection signals are input into the interface unit. The program instruction address decoder and the data address decoder may include two selection signals indicating a request for accessing program instructions in the first and second memory spaces, respectively, and two selection signals indicating a request for accessing data in the first and the second memory spaces, respectively.

Preferably, the microprocessor comprises control means for controlling the first switching means for connecting the program access bus to the first or second bus when the selection signals indicate a program instruction access request, within the respective memory space, and no simultaneous data request therein. Advantageously, the microprocessor also comprises control means for controlling the second switching means for connecting the data access bus to the first or second bus when the selection signals indicate a data access request within the corresponding memory space. According to yet another feature of the present invention, the first memory space comprises a non-volatile memory, and the second memory space comprises a volatile memory.

BRIEF DESCRIPTION OF THE DRAWINGS

These and other objects, features, and advantages of the present invention are described in more detail in the following non-limiting description of a microprocessor, in reference to the appended figures, in which.

DETAILED DESCRIPTION OF THE PREFERRED EMBODIMENTS

Figure 1:
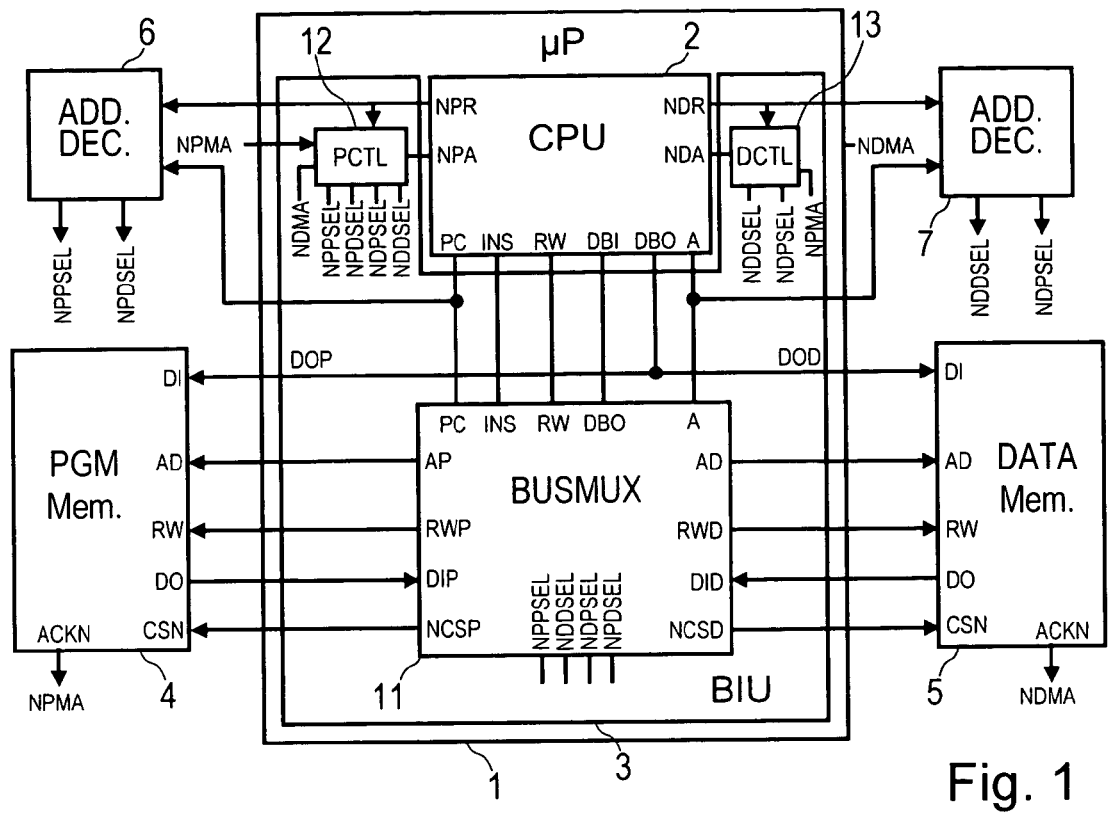
FIG. 1 schematically shows the architecture of a microprocessor, according to the present invention, connected to a program memory and a data memory.

As shown in FIG. 1, a microprocessor 1 having a Harvard architecture comprises, in a conventional way, a processing unit 2 including a program access interface and a data access interface. The program access interface includes a program counter output port PC providing the address of the instruction to be executed, an instruction bus input port INS, a program instruction request output NPR which is enabled during a clock cycle when an instruction or instruction operand has to be read, and a corresponding program instruction acceptance input NPA which is generated when the instruction or operand is read from the memory.

The data access interface includes an address output port A providing the memory address of a data element to be accessed, a data input port DBI, a data output port DBO, a read or write access mode output RW indicating whether the address provided by port A is to be accessed by reading or writing, a data request output NDR which is enabled during one clock cycle when a read or write operation has to be performed, and a corresponding data acceptance input NDA which is enabled when a data access operation is being performed by the memory.

According to the Harvard architecture, the microprocessor 1 is connected, on one side, to a program memory 4 and a program memory address decoder 6, and on the other side, to a data memory 5 and a data memory address decoder 7. Program memory 4 is non-volatile, for example, a ROM, an EEPROM or Flash memory, while data memory 5 is volatile, for example, a RAM. The PC port and NPR output in processing unit 2 are connected to the address decoder 6, while address port A and output NDR of the processor unit 2 are connected to address decoder 7.

According to the present invention, the microprocessor 1 comprises an interface unit 3, which is connected between the processing unit 2 and memories 4, 5. The interface unit is designed for insuring linear access to the addressable memory space by microprocessor 1. Moreover, address decoders 6, 7 are designed for providing various access mode selection signals for program and data memories 4, 5.

In particular, address decoder 6, in the program memory, supplies a selection signal NPPSEL indicating a request for accessing an instruction or operand in program memory 4, and a selection signal NPDSEL indicating a request for accessing an instruction or operand in data memory 5. Address decoder 7, for data memory 5, supplies a selection signal NDDSEL indicating an access to data in data memory 5, and a selection signal NDPSEL indicating a data access in program memory 4. Address decoders 6, 7 generate the selection signals only according to whether the address on bus A or PC corresponds to an address in memory 4 or memory 5. In addition, signals NPR and NDR enable decoders 6, 7, respectively, only when they are enabled.

In FIG. 1, interface unit 3 comprises a program access control unit 12 connected to input NPA of processing unit 2, a data access control unit 13 connected to input NDA, and a bus multiplexer 11 connected between processing unit 2 and memories 4, 5. In addition, data output port DBO of processing unit 2 is simultaneously connected, via respective outputs DOP and DOD in the interface unit 3, to data input ports DI of memories 4 and 5.

Specifically, bus multiplexer 11 is connected to ports PC, A, DBI and INS, as well as to output RW of the processing unit. It includes two identical connection interfaces for connection to both memories 4, 5, respectively. Each of the interfaces has an output port AP, AD to be connected to the address input port AD of memories 4 and 5, a data input port DIP, DID to be connected to the data output port DO of memories 4 and 5, an access mode output RWP, RWD connected to the corresponding input RW of the memory, and a component selection output NCSP, NCSD connected to the corresponding input CSN of memories 4, 5. In addition, the four selection signals NPPSEL, NPDSEL, NDDSEL and NDPSEL are input into multiplexer 11 and program access control unit 12, whereas only signals NDDSEL and DDPSEL related to data memory 5 access are input to data access control unit 13. Access control units 12, 13 are further supplied with signals NPR and NDR from processing unit 2, respectively.

Figure 2:
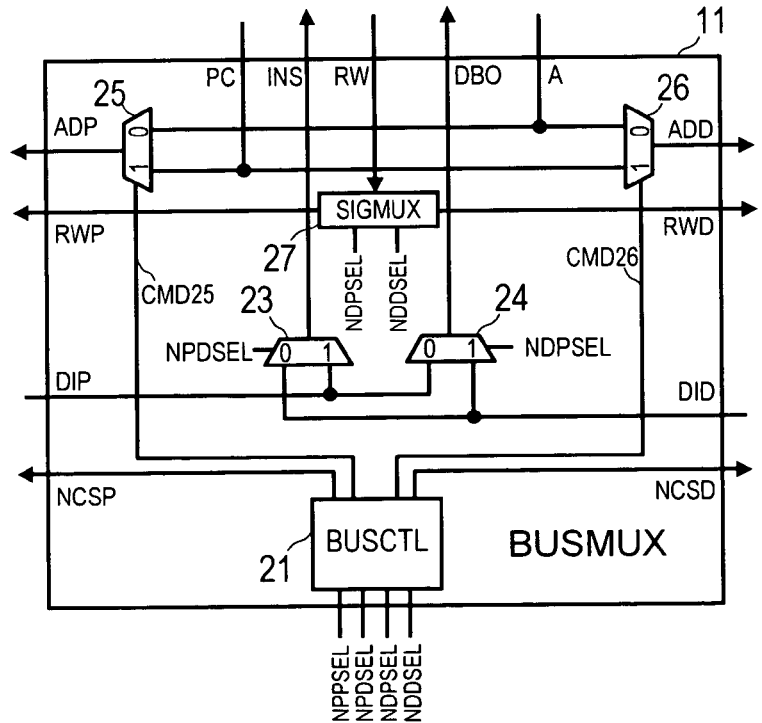
FIG. 2 is a circuit diagram of the multiplexer shown in FIG. 1.

In the following description, for example, all of the above mentioned signals are enabled when they are at low level (0 logical level). In FIG. 2, multiplexer 11 comprises a bus control unit 21 which is provided with four selection signals NPPSEL, NPDSEL, NDDSEL and NDPSEL and outputs component selection signals NCSP and NCSD, and two respective control signals CMD25, CMD26 for two multiplexers 25, 26 having two inputs 0 and 1 and one output. Both of these multiplexers 25, 26 are supplied with addresses from ports PC and A of processing unit 2 and, according to the value of their respective control signals CMD25 and CMD26, supply the address output ports AP, AD of bus multiplexer 11, with the address from either port PC or port A.

Selection signals NPDSEL and NDPSEL, which indicate a data element within the program memory or an instruction within the data memory, are supplied as control signals to two multiplexers 23, 24, respectively, which are supplied with the data read in memories 4, 5 from input ports DIP and DID of multiplexer 11. The outputs of these multiplexers are connected to output ports INS and DBO, respectively, of bus multiplexer 11, so as to direct the data input from either program memory 4 or from data memory 5 towards these ports.

In this manner, when accessing data within program memory 4 (NDPSEL=0), port DIP connected to data output DO of the program memory is connected to data output port DBO of multiplexer 11. For other access types, it is port DID which is connected to data output port DBO of multiplexer 11. Similarly, when accessing an instruction in data memory 5 (NPDSEL=0), port DID of multiplexer 11 is connected to its instruction output port INS. In the opposite case, it is port DIP of multiplexer 11 that is coupled to output port INS. In addition, bus multiplexer 11 comprises a signal demultiplexer 27 for directing signal RW from processing unit 2 either towards program memory 4, through output RWP, or towards data memory 5 through output RWD, in accordance with selection signals NDPSEL and NDDSEL relating to data access within the program memory 4 or data memory 5.

Figure 3:
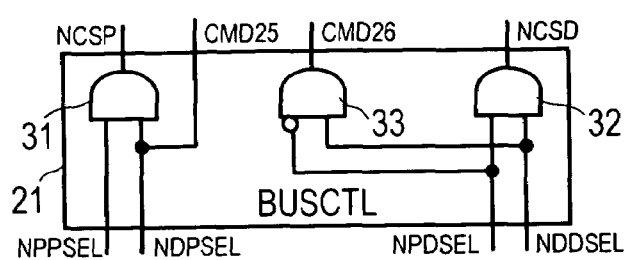
FIGS. 3 and 4 respectively show two circuit components illustrated in FIG. 2.

In FIG. 3, the bus control unit 21 comprises, for example, three AND gates 31, 32, 33. Gate 31 is supplied with selection signals NPPSEL and NDPSEL and outputs signal NCSP. Similarly, gate 33 is supplied with selection signals NPDSEL and NDDSEL and outputs signal NCSP. In this manner, signals NCSP and NCSD are related to the selection signals as follows:

NCSD=NPDSEL AND NDDSEL, and

NCSP=NPPSEL AND NDPSEL.  (1)

The third AND gate 33 has an inverted input to which the selection signal NPDSEL is supplied and a forward input to which signal NDDSEL is supplied. The output of the gate 33 provides a control signal CMD26 for multiplexer 26, as shown in FIG. 2. Thus, input 1 of multiplexer 26, that is bus PC, is selected to define the address for accessing data memory 5 if selection signals NDDSEL and NPDSEL satisfy the following condition:

NPDSEL=0 AND NDDSEL=1  (2)

In the opposite case, bus A will be connected to address port AD of data memory 5. Circuit 21 also provides a control signal CMD25 for multiplexer 25. This control signal corresponds to signal NDPSEL so that address port AD of data memory 5 is coupled to address bus A if signal NDPSEL=1 and to bus PC otherwise.

Figure 4:
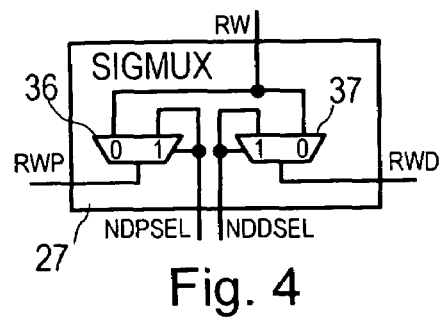

FIG. 4 shows an embodiment of signal multiplexer circuit 27. The circuit 27 comprises two multiplexers 36 and 37 having two inputs 0, 1. Input 0 is supplied with signal RW from processing unit 2, and input 1 is supplied with selection signals NDPSEL and NDDSEL, respectively. The control input of each multiplexer 36, 37 is fed-back to input 1. Thus, signal RW as an input is applied to output TWP of interface 11, that is, to input RW of the program memory 4 if NDPSEL=0, and to output RWD of interface 11, that is, to input RW of data memory 5, if NDDSEL=0. In the opposite case, outputs RWP and RWD are forced to 1.

Figure 5A:
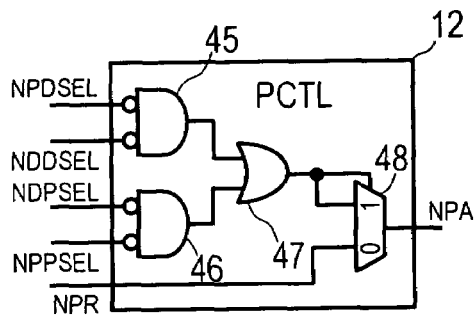
FIGS. 5a to 5d show alternate embodiments of a component illustrated in FIG. 1.

FIG. 5a shows a first embodiment of program access control unit 12. In FIG. 5a, access control unit 12 has two AND gates 45, 46 with inverted inputs. First gate 45 is supplied with selection signals NDDSEL and NPDSEL, while second gate 46 is supplied with selection signals NDPSEL and NPPSEL. The outputs of both gates are connected to an OR gate 45 having its output connected to the control input and input 1 of a multiplexer 48 with two inputs 0, 1. The output of multiplexer 48 provides signal NPA which is input to processing unit 2, and input 0 of the multiplexer 48 is supplied with signal NPR from the processing unit. Thus, signal NPA is set to 1 (access of processing unit to the program is disabled) when the following condition is fulfilled:

(NDPSEL=0 AND NPPSEL=0), or (NDDSEL=0 AND NPDSEL=0)  (3)

and is equal to signal NPR otherwise.

Figure 5B:
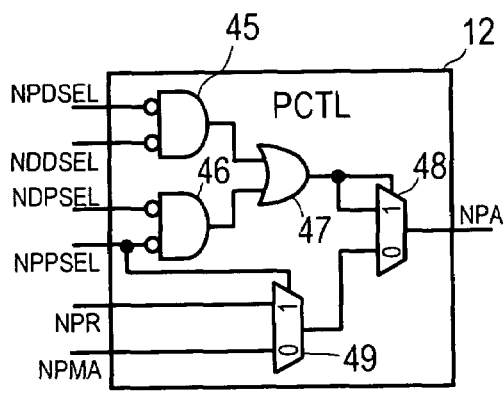

FIG. 5b shows a second embodiment of access control unit 12 which can be used when program memory 4 has an output ACKN providing an access request acknowledgment signal NPMA. In its high state, this signal indicates that no memory access is being made.

If acknowledgment signal NPMA exists, it is input into access control unit 12. The circuit shown in FIG. 5b corresponds to the circuit shown in FIG. 5a, except that it comprises a second multiplexer 49 with two inputs 0, 1. The second multiplexer 49 is interposed between the input of signal NPR and input 0 of multiplexer 48, wherein signal NPR is applied to input 1 of the multiplexer 49 and signal NPMA is applied to input 0 thereof. In addition, multiplexer 49 is controlled by selection signal NPPSEL. In this manner, in case condition (3) is not fulfilled, access control unit 12 outputs signal NPMA if selection signal NPPSEL is 0, and signal NPR otherwise.

Figure 5C:
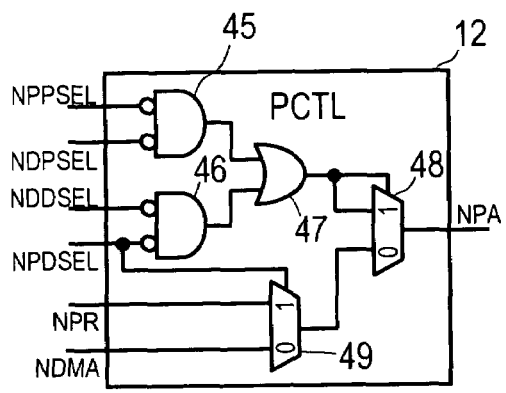

FIG. 5c shows a third embodiment of access control unit 12 which can be used when only data memory 5 has an output ACKN for an acknowledgment signal NDMA. In this case, this acknowledgment signal is input to access control unit 12. The circuit shown in FIG. 5c corresponds to the circuit shown in FIG. 5b, except that signal NDMA is applied to input 0 of multiplexer 49 instead of signal NPMA, and multiplexer 49 is controlled by selection signal NPDSEL instead of signal NPPSEL. In this manner, in case condition (3) is not fulfilled, access control unit 12 outputs signal NDMA if selection signal NPDSEL is 0, and signal NPR otherwise.

Figure 5D:
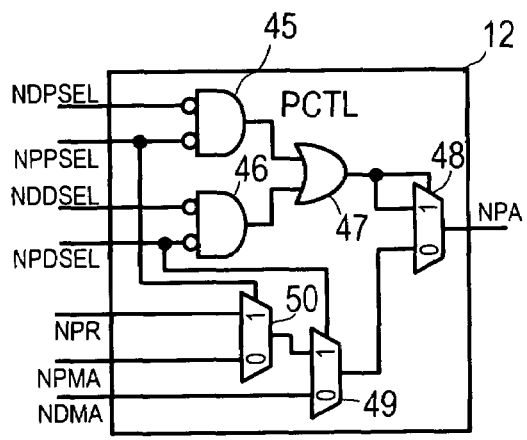

FIG. 5d shows a fourth embodiment of access control unit 12 which can be used when both memories 4, 5 have an output ACKN for acknowledgment signals NDMA and NPMA, respectively. In this case, both acknowledgment signals are input to access control unit 12. The circuit shown in FIG. 5d corresponds to the circuit shown in FIG. 5c, except that it comprises a third multiplexer 50 with two inputs 0, 1, interposed between input 1 of multiplexer 49 and the input for signal NPR. This input is connected to input 1 of multiplexer 50 whose input 0 is supplied with signal NPMA, and the control input for signal NPPSEL. In this manner, in case condition (3) is not fulfilled, access control unit 12 outputs signal NPMA if selection signal NPPSEL is 0, signal NDMA if selection signal NPDSEL is 0, and signal NPR otherwise.

In case memories 4 and 5 do not supply signals NPMA and NDMA, control unit 13 supplies the input NDA of processing unit 2 with signal NDR from the latter. In case only program memory 4 supplies such a signal NPMA, input NDA is supplied with signal NPMA if selection signal NDDSEL=0 and signal NDR otherwise. Such a function can be implemented by a single multiplexer with its control input supplied with signal NDDSEL, its input 0 supplied with signal NPMA, and its input 1 with signal NDR. Similarly, where data memory 5 supplies such signal NDMA, input NDA is supplied with signal NDMA if selection signal NDPSEL=0 and signal NDR otherwise.

Figure 6:
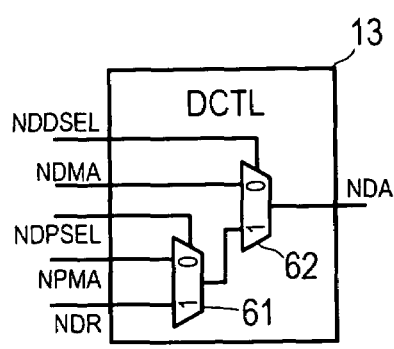
FIG. 6 shows a circuit diagram of a component illustrated in FIG. 1.

In case both signals NPMA and NDMA are available, access control unit 13 can be implemented in the way shown in FIG. 6. In FIG. 6, control unit 13 comprises two multiplexers 61 and 62 with two inputs 0, 1. Multiplexer 61 is supplied with signal NPMA at its input 0, signal NDR at its input 1, and signal NDDSEL at its control input. The output of multiplexer 61 is coupled to input 1 of second multiplexer 62, with its input 0 supplied with signal NDMA, its control input with signal NDPSEL, and its output providing signal NDA which is input to processing unit 2. Thus, signal NDA is equal to NDMA if NDDSEL=0, NPMA if NDPSEL=0 and NDR otherwise.

Figure 7:
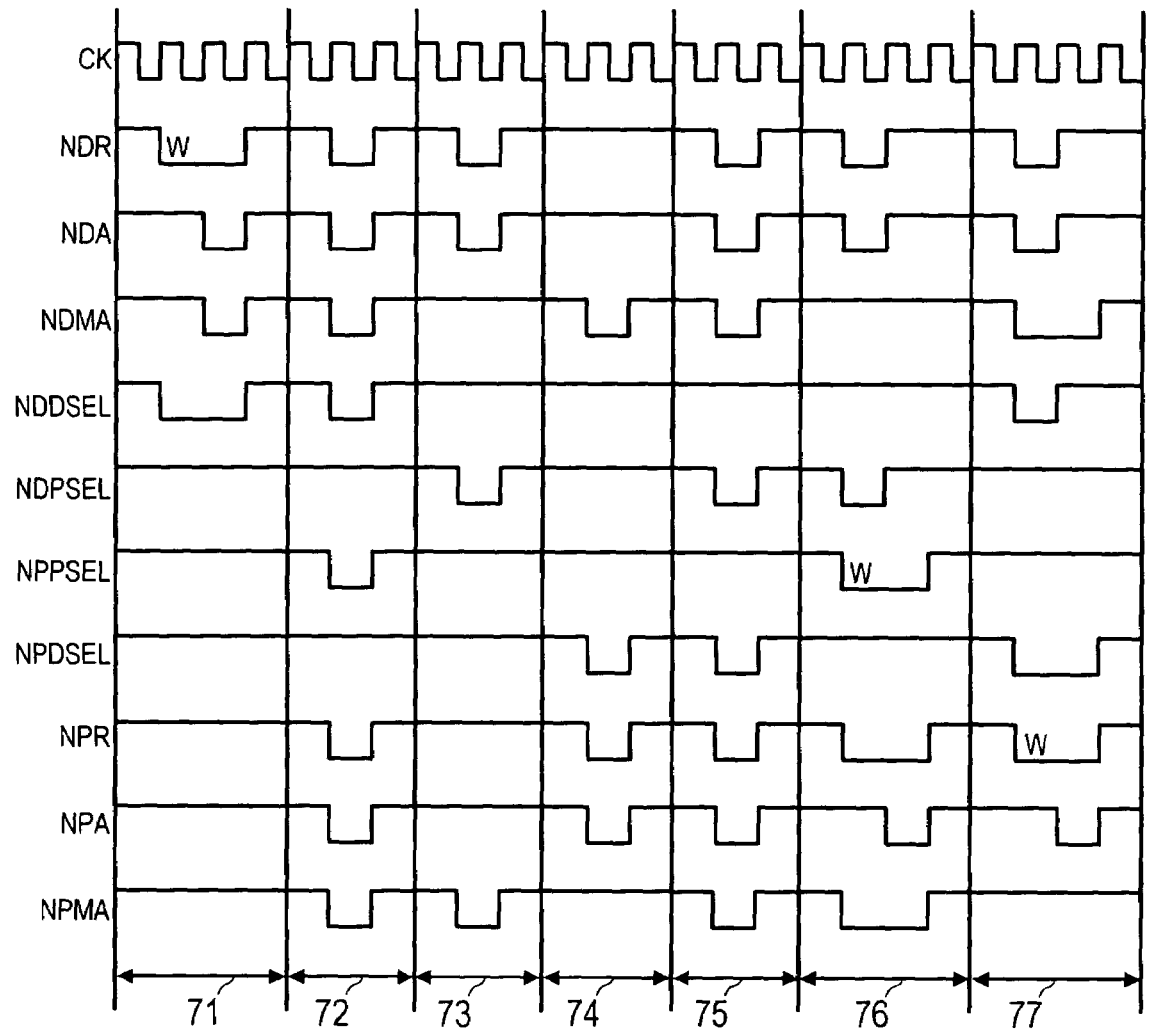
FIG. 7 shows, in the form of timing diagrams, various signals used in the architecture shown in FIG. 1.

FIG. 7 illustrates the operation of interface unit 3 using timing diagrams for the various above-mentioned signals, in synchronization with clock signal CK from microprocessor 1. These signals are in the enabled state when they are at logical level 0. Phase 71 shown in FIG. 7 corresponds to extended access to data memory 4. Such an access occurs when processing unit 2 provides signal NDR in the enabled state during two clock cycles, that is with a wait cycle W. In this case, signal NDDSEL, which is generated by address decoder 7, corresponds to signal NDR. Signal NDMA, which is generated by memory 5, is enabled only during the second cycle when signal NDR is enabled. As a result, during phase 71, signal NDA is enabled only during the second clock cycle when the access to memory 5 occurs.

Phase 72 illustrates the case of a standard concurrent access to memories 4, 5, wherein a data element is accessed in data memory 5 and an instruction or operand is read from program memory 4. In this case, the processing unit sends access requests to both memories (NPR and NDR are enabled). As a response, and based on the memory addresses to be accessed, address decoders 6, 7 enable selection signals NPPSEL and NDDSEL. As a result, bus controller 21 enables memories 4, 5 by signals NCSP and NCSD. Signals NDMA and NPMA then become enabled, and access control unit 12 supplies signal NPMA to input NPA of processing unit 2, which is then allowed to read an instruction or operand from program memory 4. Meanwhile, access control unit 13 supplies signal NPMA to input NDA of processing unit 2, which is then granted access to data in program memory 4.

This phase shows that processing unit 2 can concurrently access memories 4 and 5 during a single clock cycle for reading an instruction from program memory 4 and a data element from data memory 5. During phase 73, processing unit 2 accesses program memory 4 for accessing data. For that purpose, it enables output NDR. As a response, and by means of the memory address to be accessed, address decoder 7 enables selection signal NDPSEL. As a result, bus controller 21 enables memory 4 by means of signal NCSP. Signal NPMA then also becomes enabled and access control unit 12 supplies signal NDMA to input NPA of processing unit 2 which is then granted access to data in program memory 4.

During phase 74, processing unit 2 accesses data memory 5 for reading a program instruction or operand. For this purpose, it enables output NPR. As a response, and by means of the memory address to be accessed, address decoder 6 enables selection signal NPDSEL. As a result, bus controller 21 enables memory 5 by signal NCSD. Signal NDMA then also becomes enabled and access control unit 12 supplies signal NDMA to input NPA of processing unit 2 which is then allowed to read an instruction from data memory 5.

In both previous phases, no memory access contention has occurred, so that the processing unit can perform an access within one signal clock cycle. As a result, contrary to the prior art Harvard architecture, the data and program are accessible from the whole memory space addressable by the microprocessor, without the need for any additional processing cycles.

Phase 75 illustrates a case opposite to phase 72, where the processing unit simultaneously sends a data access request for program memory 4 and a request for reading an instruction or operand from data memory 5. Signals NPR and NDR thus become enabled at the same time. In this case, address decoders 6, 7 enable signals NDPSEL and NPDSEL. As a result, bus controller 21 enables memories 4, 5 by signals NCSP and NCSD. Signals NDMA and NPMA then also become enabled and access control unit 12 supplies signal NDMA to input NPA of processing unit 2, which is then allowed to read an instruction or operand from data memory 5. Meanwhile, access control unit 13 supplies signal NPMA to input NDA of processing unit 2, which is then granted access to data in program memory 4. This phase shows that, also in this case, concurrent access to both memories 4, 5 during a single clock cycle (with signals NPA and NDA enabled at the same time), can be carried-out without any contention, which was not the case with the previous architectures.

During phase 76, processing unit 2 seeks access to program memory 4 to read both an instruction or operand, and a data element. Signals NPR and NDR therefore become enabled at the same time. As a result, signals NDPSEL and NPPSEL also become enabled at the same time, like signal NCSP from bus controller 21, and therefore, signal NPMA from program memory 4.

During a first clock cycle when signals NDR and NPR are enabled, input NDA is supplied with signal NPMA (NDPSEL=0) and signal NPA is forced to 1 (disabled). As a consequence, access to the data within the program memory is carried-out, whereas instruction reading is prevented. As a result, a wait cycle W is introduced for reading the instruction. At the end of the data access cycle, signal NDR becomes disabled again, so that signals NDPSEL and NDA are disabled again, wherein signal NDR is supplied to input NDA by control unit 13. As a result, during the second clock cycle, signal NPA becomes enabled (=NPMA), which allows the requested instruction read operation to be performed in program memory 4.

Phase 77 illustrates the case of two concurrent accesses to data memory 5 for reading an instruction and accessing a data element. Again, signals NPR and NDR are enabled at the same time by processing unit 2. As a result, signals NDDSEL and NPDSEL also become enabled at the same time, like signal NCSD from bus controller 21, and thus signal NDMA from data memory 5.

During a first clock cycle when signals NDR and NPR are enabled, input NDA is supplied with signal NPMA (NDPSEL=0) and signal NPA is forced to 1 (disabled). As a consequence, the access to data in program memory is performed, whereas instruction reading is prevented, which also leads to the introduction of a wait cycle W. At the end of the data access cycle, signal NDR becomes disabled again, so that signals NDPSEL and NDA are disabled again. During the second clock cycle, signal NPA becomes enabled (=NDMA) and allows the requested instruction reading operation to be performed in data memory 5.

Accordingly, two concurrent requests for accessing the same memory, whether the program or the data memory, are carried-out within two clock cycles. It should be noted that data access is done first, which is in accordance with the operational mode of microprocessors in which accessing data results from the execution of a previously read instruction. In this respect, it is preferable to complete execution of a previous instruction before reading the next instruction.

By means of an interface unit, which can be implemented through a relatively simple logic circuit, the present invention therefore allows indiscriminate access to programs and data. Indiscriminate access to data is distributed in an arbitrary way among two memory spaces that are concurrently accessible by the processing unit by two respective buses.

That which is claimed is:

1. A microprocessor to be connected to a first memory through a first bus and to a second memory through a second bus, the microprocessor comprising:

a processing unit;
a program access bus connected to said processing unit;
a data access bus connected to said processing unit;
a bus interface unit connected to the first and second buses, to said program instruction access bus and to said data access bus, said bus interface unit comprising
a first switching circuit for connecting said program access bus to either the first bus or the second bus in accordance with a program access request sent by said processing unit, and
a second switching circuit for connecting said data access bus to either the first bus or the second bus in accordance with a data access request sent by said processing unit; and
an access control circuit for arbitrating accessing contention occurring when said processing unit simultaneously sends the data access request and the program access request relating to a same memory space.

2. A microprocessor according to claim 1, wherein said first switching circuit is independent of said second switching circuit.

3. A microprocessor according to claim 1, wherein said access control circuit grants priority to the data access request when contention for accessing the first memory and the second memory occurs.

4. A microprocessor according to claim 1, wherein said access control circuit grants concurrent access to a program instruction within one of the first and second memories and a data element within the other of the first and second memories.

5. A microprocessor according to claim 1, wherein said access control circuit prevents said processing unit from accessing a program instruction due to said processing unit sending concurrent requests for accessing the program instruction and a data element in a same memory space.

6. A microprocessor according to claim 1, wherein said access control circuit grants said processing unit access to either the first memory or the second memory for a time period during which each memory grants access thereto.

7. A microprocessor according to claim 1, wherein the first memory comprises a non-volatile memory and the second memory comprises a volatile memory.

8. A microprocessor system comprising:
a first memory and a first bus connected thereto;
a second memory and a second bus connected thereto; and
a microprocessor connected to said first and second memories via said first and second buses, respectively, said microprocessor comprising
a processing unit,
a program access bus connected to said processing unit,
a data access bus connected to said processing unit, and
a bus interface unit connected to said first and second buses, to said program access bus and to said data access bus, said bus interface unit comprising
a first switching circuit for connecting said program access bus to either the first bus or the second bus in accordance with a program access request sent by said processing unit,
a second switching circuit for connecting said data access bus to either the first bus or the second bus in accordance with a data access request sent by said processing unit, and
an access control circuit for arbitrating accessing contention occurring when said processing unit simultaneously sends the data access request and the program access request relating to a same memory space.

9. A microprocessor system according to claim 8, wherein said first switching circuit is independent of said second switching circuit.

10. A microprocessor system according to claim 8, wherein said access control circuit grants priority to the data access request when contention for accessing said first memory and said second memory occurs.

11. A microprocessor system according to claim 8, wherein said access control circuit grants concurrent access to a program instruction within one of said first and second memories and a data element within the other of said first and second memories.

12. A microprocessor system according to claim 8, wherein said access control circuit prevents said processing unit from accessing a program instruction due to said processing unit sending concurrent requests for accessing the program instruction and a data element in a same memory space.

13. A microprocessor system according to claim 8, wherein said access control circuit grants said processing unit access to either said first memory or said second memory for a time period during which each memory grants access thereto.

14. A microprocessor system according to claim 13, further comprising:
a program instruction address decoder connected to said microprocessor; and
a data address decoder connected to said microprocessor;
said program instruction address decoder and said data address decoder for generating a plurality of selection signals in accordance with addresses present on said program access bus and said data access bus and in accordance with the program access request sent by said processing unit, the plurality of selection signals including two selection signals for indicating a request for accessing a program instruction in said first and second memories, respectively, and two more selection signals for indicating a request for accessing a data element in said first and second memories, respectively.

15. A microprocessor system according to claim 8, wherein said first memory comprises a non-volatile memory and said second memory comprises a volatile memory.

16. A method for accessing an instruction code stored in a first memory and a data element stored in a second memory using a microprocessor, with the first and second memories being connected to the microprocessor via first and second buses, respectively, and the microprocessor comprises an executable program instruction access bus connected to a processing unit, a data access bus connected to the processing unit, and a bus interface unit connected to the first and second buses, to the program access bus and to the data access bus, the method comprising:
connecting the program access bus to either the first bus or the second bus in accordance with a program access request sent by the processing unit;
connecting the data access bus to either the first bus or the second bus in accordance with a data access request sent by the processing unit; and
arbitrating accessing contention occurring when the processing unit simultaneously sends the data access request and the program access request relating to a same memory space.

17. A method according to claim 16, wherein the first switching circuit is independent of the second switching circuit.

18. A method according to claim 16, wherein arbitrating accessing contention further comprises preventing the processing unit from accessing a program instruction due to the processing unit sending concurrent requests for accessing the program instruction and a data element in a same memory space.

19. A method according to claim 16, wherein arbitrating accessing contention further comprises granting the processing unit access to either the first memory or the second memory for a time period during which each memory grants access thereto.

20. A method according to claim 19, wherein the processing unit is connected to a program instruction address decoder and to a data address decoder, the program instruction address decoder and the data address decoder generating a plurality of selection signals in accordance with addresses present on the program access bus and the data access bus and in accordance with the program access request sent by the processing unit, the plurality of selection signals including two selection signals for indicating a request for accessing a program instruction in the first and second memories, respectively, and two more selection signals for indicating a request for accessing a data element in the first and second memories, respectively.

21. A method according to claim 20, further comprising connecting the program access bus to the first bus or the second bus when the plurality of selection signals indicate a request for accessing the program instruction in the first or second memory, and does not indicate a concurrent request for accessing the data element therein.

22. A method according to claim 20, further comprising connecting the data access bus to the first bus or the second bus when the plurality of selection signals indicate a request for accessing the data element in the first or second memory.

23. A method according to claim 16, wherein the first memory comprises a non-volatile memory and the second memory comprises a volatile memory.

\* \* \* \* \*